(12) United States Patent
Cai et al.

(10) Patent No.: US 8,271,007 B2
(45) Date of Patent: Sep. 18, 2012

(54) MANAGING SMS SPOOFING USING SMPP PROTOCOL

(75) Inventors: Yigang Cai, Naperville, IL (US); Gyan Shanker, Naperville, IL (US)

(73) Assignee: Alcatel Lucent, Paris (FR)

( * ) Notice: Subject to any disclaimer, the term of this patent is extended or adjusted under 35 U.S.C. 154(b) by 445 days.

(21) Appl. No.: 12/652,867

(22) Filed: Jan. 6, 2010

(65) Prior Publication Data
US 2011/0165860 A1    Jul. 7, 2011

(51) Int. Cl.
*H04W 4/00* (2009.01)
(52) U.S. Cl. ............... 455/466; 455/411; 455/414.1; 455/415; 370/349; 370/352
(58) Field of Classification Search ............. 455/411, 455/414.1, 415, 466; 370/349, 352
See application file for complete search history.

(56) References Cited

U.S. PATENT DOCUMENTS
7,103,372 B1    9/2006  Kupsh
2008/0004049 A1  1/2008  Yigang et al.

FOREIGN PATENT DOCUMENTS
DE    19740558 A1    3/1999

OTHER PUBLICATIONS

Hongwei Luo China Academy of Telecom Research MII China Lijun Liu China Mobile China: "Updated Draft Recommendation X.ssf: Short Message Service (SMS) Spam Filtering system based on User-Specificed rules (for approval); 0157rev2", ITU-T Drafts; Study period 2009-2012, International Telecommunication Union, Geneva, ;CH, vol. Study Group 17; 5/17, Feb. 19, 2009, pp. 1-21, XP017453393.

*Primary Examiner* — Amancio Gonzalez
(74) *Attorney, Agent, or Firm* — Duft Bornsen & Fishman LLP

(57) ABSTRACT

Systems and methods are disclosed for managing Short Messaging Service (SMS) spoofing using Short Messaging Peer-to-Peer (SMPP) protocol. An SMPP protocol communication includes an SMPP transmitter and an SMPP transceiver. The SMPP transmitter identifies or receives an SMS message for transmission to a destination. The SMPP transmitter identifies a source address for the SMS message, and determines whether the source address is authentic. If the source address is not authentic, then the SMPP transmitter inserts a validity indicator in an SMPP Packet Data Unit (PDU), along with the SMS message, that the source address is not authentic before transmitting the SMPP PDU to the SMPP transceiver. Upon receiving the SMPP PDU from the SMPP transmitter, the SMPP transceiver may determine whether or not to deliver the SMS message to the destination based on the validity indicator provided by the SMPP transmitter.

20 Claims, 5 Drawing Sheets

MANAGING SMS SPOOFING USING SMPP PROTOCOL

BACKGROUND

1. Field of the Invention

The invention is related to the field of communications and, in particular, to delivery of SMS messages using SMPP protocol.

2. Statement of the Problem

Text messaging has become a very popular mode of communication in many mobile networks, such as a Public Land Mobile Network (PLMN). One example of text messaging is Short Messaging Service (SMS), which is a communication protocol allowing the exchange of short text messages (i.e., 160 characters) between mobile devices. Often times, mobile users more frequently use text messaging for communication than voice calls.

Short Message Peer-to-Peer (SMPP) protocol is a telecommunication protocol used for exchanging SMS messages between peer entities, such as Short Messaging Service Centers (SMSC) and External Short Messaging Entities (ESME). SMPP protocol defines a set of operations for the exchange of SMS messages between SMS peer entities, and defines the data that SMS peer entities exchange during SMPP operations. The entity submitting an SMPP operation is referred to as an SMPP transmitter. The entity receiving the SMPP operation is referred to as an SMPP transceiver. SMPP protocol is based on pairs of request/response Packet Data Units (PDU) that are exchanged between the SMPP transmitter and the SMPP transceiver. The SMS messages are encapsulated within the body of the PDU.

SMS spoofing is a technology or practice where a source address or an originating number in an SMS message is replaced with another number or alphanumeric text. SMS spoofing has both legitimate uses and illegitimate uses. For example, a legitimate use of SMS spoofing is to replace a source address in an SMS message with a company name so that the recipient of the SMS messages sees the company name. An illegitimate use of SMS spoofing is to replace a source address in an SMS message with a fake number to impersonate another person, company, etc. One problem in present mobile networks is that SMS spoofing is not effectively managed.

SUMMARY

Embodiments described herein validate the source address of SMS messages through SMPP protocol to reduce occurrences of SMS spoofing. Before sending an SMS message to an SMPP transceiver, an SMPP transmitter determines whether the source address of the SMS message is authentic or trusted. If not, the SMPP transmitter may insert a validity indicator in the SMPP PDU that SMS spoofing was suspected for the enclosed SMS message. The SMPP transceiver, which receives the SMPP PDU, may then process the validity indicator to determine whether or not to deliver the SMS message to its destination. The embodiments advantageously reject some of the SMS messages suspected of SMS spoofing, which reduces the overall effect that SMS spoofing has on a mobile network.

One embodiment comprises an SMPP transmitter operable to identify (or receive) an SMS message for transmission to a destination. The SMPP transmitter is further operable to identify a source address for the SMS message, and to determine whether the source address is authentic. If the determination is that the source address is not authentic, then the SMPP transmitter is further operable to insert a validity indicator in an SMPP PDU, along with the SMS message, that the source address is not authentic before transmitting the SMPP PDU to an SMPP transceiver (or to reject the SMS message).

In another embodiment, if the determination is that the source address is authentic, then the SMPP transmitter is further operable to insert a validity indicator in the SMPP PDU that the source address is authentic before transmitting the SMPP PDU to the SMPP transceiver.

In another embodiment, if the determination is that the source address is not authentic, then the SMPP transmitter is further operable to determine whether the source address is suspected of being fake. If the determination is that the source address is suspected of being fake, then the SMPP transmitter is further operable to insert a validity indicator in the SMPP PDU that the source address is suspected of being fake before transmitting the SMPP PDU to the SMPP transceiver.

In another embodiment, if the determination is that the source address is not suspected of being fake, then the SMPP transmitter is further operable to insert a validity indicator in the SMPP PDU that the source address is not suspected of being fake before transmitting the SMPP PDU to the SMPP transceiver.

In another embodiment, the SMPP transceiver is operable to receive the SMPP PDU from the SMPP transmitter that includes the SMS message, and to parse the SMPP PDU to identify the validity indicator inserted by the SMPP transmitter. If the validity indicator in the SMPP PDU indicates that the source address for the SMS message is not authentic, then the SMPP transceiver is further operable to determine whether to deliver the SMS message to a destination.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
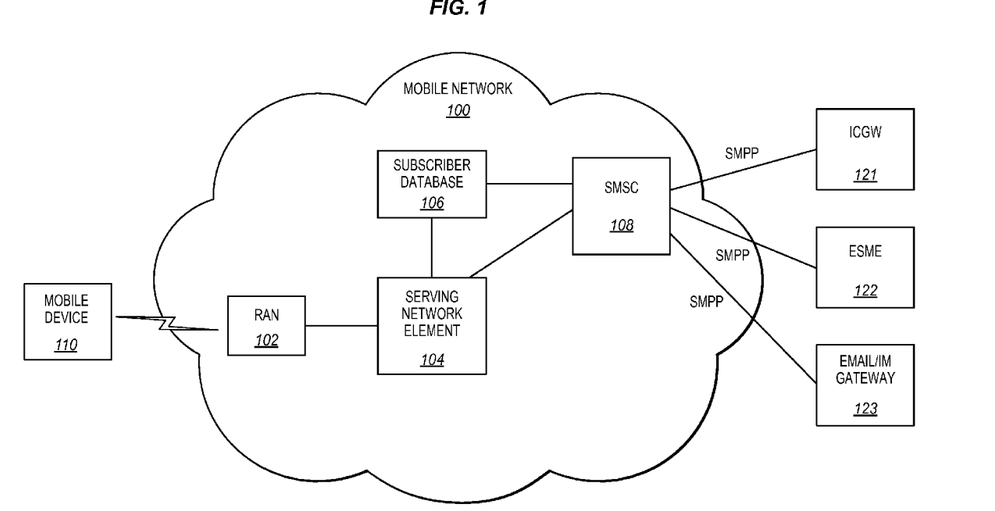
FIG. 1 illustrates a mobile network in an exemplary embodiment.

FIG. 1 illustrates a mobile network 100 in an exemplary embodiment. Mobile network 100 may comprise a circuit-based network, such as a CDMA network or a GSM network, may comprise a packet-based network, such as an IP Multimedia Subsystem (IMS) network, or a mix of the two. Mobile network 100 includes a Radio Access Network (RAN) 102, a serving network element 104, a subscriber database 106, and a Short Messaging Service Center (SMSC) 108. RAN 102 comprises any radio or wireless network that interfaces a mobile device with a core network (represented by serving network element 104 in FIG. 1). Examples of RAN 102 include a GSM RAN, a CDMA RAN, a UMTS RAN, a WLAN, etc. Serving network element 104 comprises any switch, server, or other node in a core network that serves mobile devices. For instance, serving network element 104 may comprise an MSC in a circuit-based network, or may comprise a Call Session Control Function (CSCF) in a packet-based IMS network. Subscriber database 106 comprises any database or similar system that stores and maintains subscriber information or a subscriber profile for one or more mobile subscribers. For instance, subscriber database 106 may maintain a subscriber profile for a user of mobile device 110. SMSC 108 comprises any system, server, or node operable to handle SMS messages within mobile network 100.

Also illustrated in communication with mobile network 100 are an Incoming Call Gateway (ICGW) 121, an External Short Messaging Entity (ESME) 122, and an email/IM Gateway 123. Each of these entities communicates with SMSC 108 using SMPP protocol. Although not specifically shown, there may be other entities that communicate with SMSC 108 using SMPP protocol.

Figure 2:
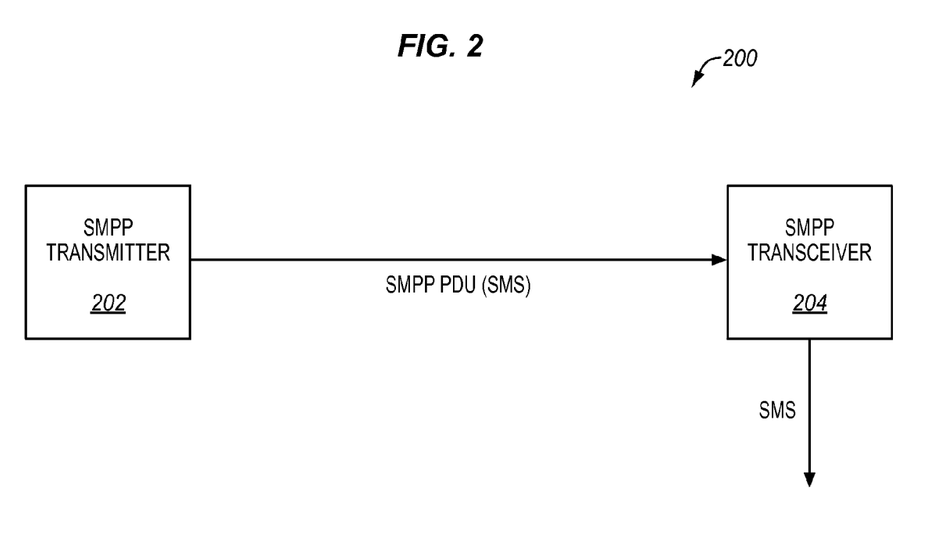
FIG. 2 illustrates an SMPP system comprising an SMPP transmitter coupled to an SMPP transceiver in an exemplary embodiment.

As stated before, SMPP protocol defines a set of operations for the exchange of SMS messages between SMS peer entities, and defines the data that SMS peer entities exchange during SMPP operations. The entity submitting an SMPP operation is referred to as an SMPP transmitter, and the entity receiving the SMPP operation is referred to as an SMPP transceiver. FIG. 2 illustrates an SMPP system 200 comprising an SMPP transmitter 202 coupled to an SMPP transceiver 204 in an exemplary embodiment. By way of example, SMPP transmitter 202 may comprise one of ICGW 121, ESME 122, or email/IM gateway 123, while SMPP transceiver 204 may comprise SMSC 108. Although SMPP system 200 has been described with reference to mobile network 100, those skilled in the art will appreciate that SMPP system 200 may be used in any network that exchanges SMS messages.

SMPP transmitter 202 is able to encapsulate an SMS message in an SMPP Packet Data Unit (PDU), and send the SMPP PDU to SMPP transceiver 204. The PDU includes a header, which may look as follows:

'command_length', (60) . . . 00 00 00 3C
'command_id', (4) . . . 00 00 00 04
'command_status', (0) . . . 00 00 00 00
'sequence_number', (5) . . . 00 00 00 05

The PDU also includes a body, which may look as follows:

'service_type', ( ) . . . 00
'source_addr_ton', (2) . . . 02
'source_addr_npi', (8) . . . 08
'source_addr', (555) . . . 35 35 35 00
'dest_addr_ton', (1) . . . 01
'dest_addr_npi', (1) . . . 01
'dest_addr', (555555555) . . . 35 35 35 35 35 35 35 35 35 00
'esm_class', (0) . . . 00
'protocol_id', (0) . . . 00
'priority_flag', (0) . . . 00
'schedule_delivery_time', ( ) . . . 00
'validity_period', ( ) . . . 00
'registered_delivery', (0) . . . 00
'replace_if_present_flag', (0) . . . 00
'data_coding', (0) . . . 00
'sm_default_msg_id', (0) . . . 00
'sm_length', (15) . . . 0F
'short_message', (xxxx) . . . 48 65 6C 6C 6F 20 77 69 6B 69 70 65 64 69 61'

To combat SMS spoofing in the embodiments provided herein, SMPP transmitter 202 checks the validity of the source address for the SMS message before sending the SMPP PDU to SMPP transmitter 204. If SMPP transmitter 202 determines that the source address is fake or is suspected of being fake, then SMPP transmitter 202 may insert a validity indicator in the SMPP PDU (or reject the SMS message). Thus, SMPP transmitter 202 performs a first layer of checking on the SMS message, and is able to provide SMPP transceiver 204 with information on the validity of the SMS message. A further description of this is illustrated in FIGS. 3-4.

Figure 3:
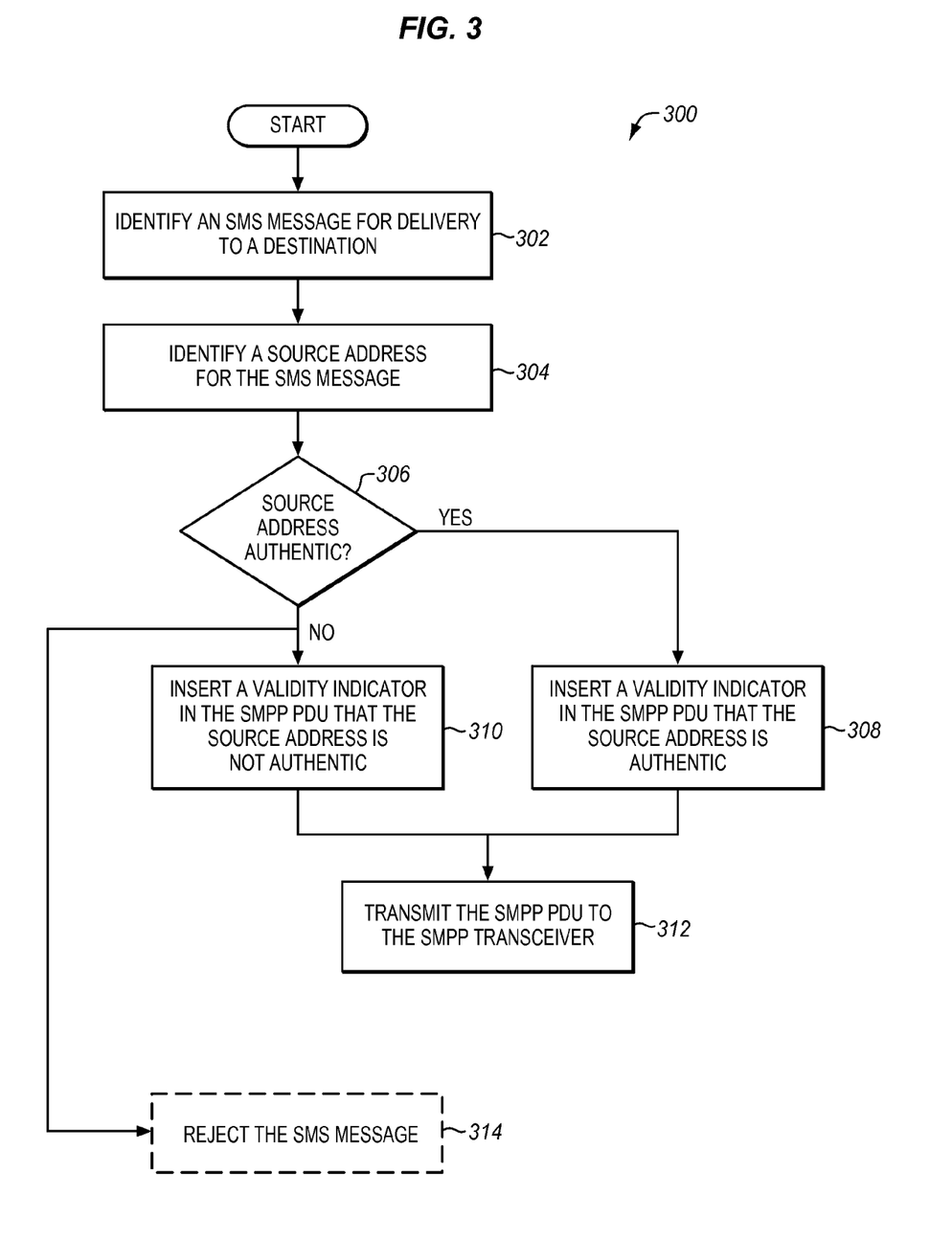
FIG. 3 is a flow chart illustrating a method of checking SMS messages within an SMPP transmitter in an exemplary embodiment.
Figure 4:
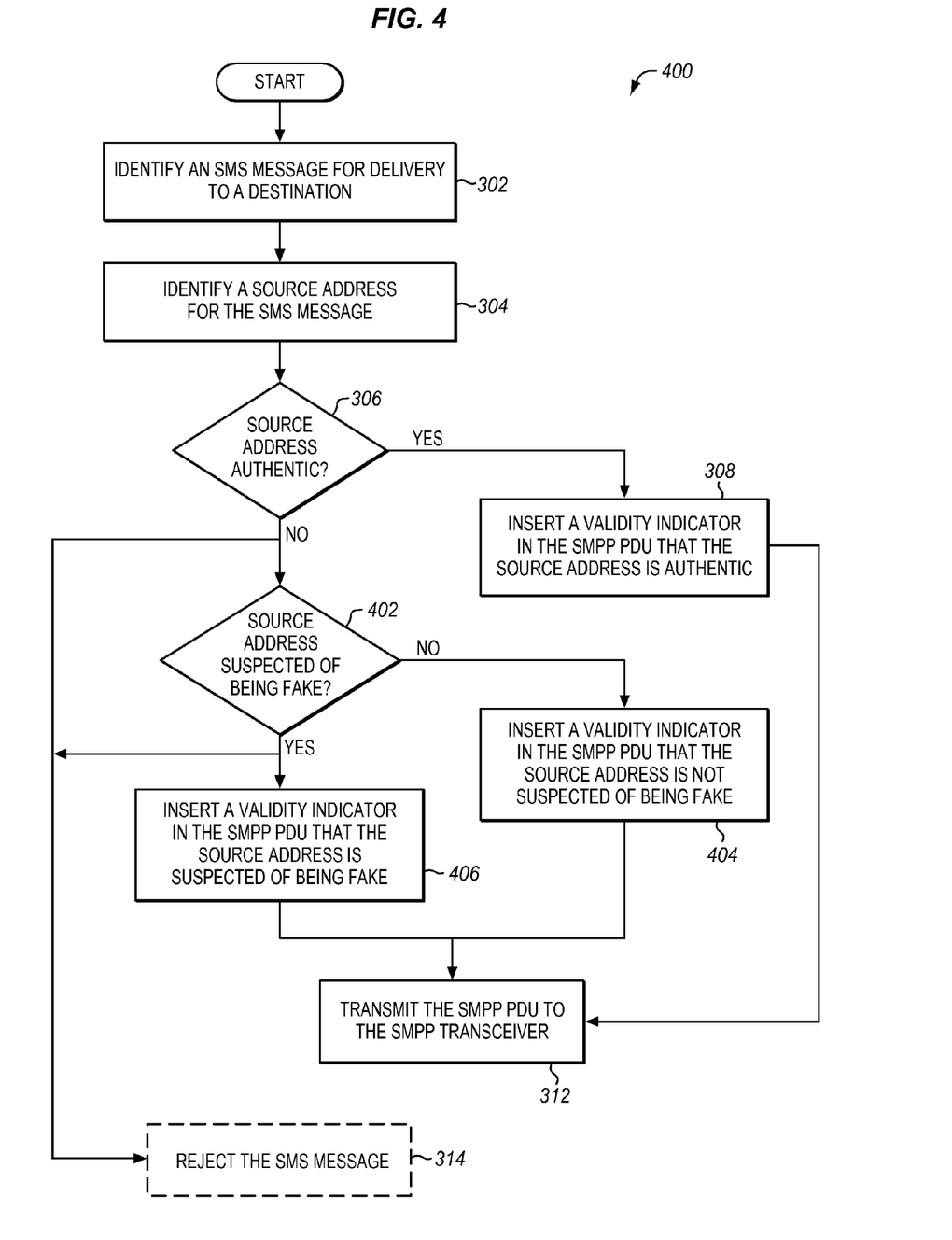
FIG. 4 is a flow chart illustrating an alternative method of checking SMS messages within an SMPP transmitter in an exemplary embodiment.

FIG. 3 is a flow chart illustrating a method 300 of checking SMS messages within SMPP transmitter 202 in an exemplary embodiment. The steps of method 300 will be described with reference to SMPP system 200 in FIG. 2. The steps of the flow charts described herein are not all inclusive and may include other steps not shown. The steps may also be performed in an alternative order.

In step 302, SMPP transmitter 202 identifies (or receives) an SMS message sent by a source for delivery to a destination. For example, SMPP transmitter 202 may receive an SMS message from another entity, or may generate an SMS message for transmission. SMPP transmitter 202 does not deliver the SMS message directly to the destination, but instead needs to forward the SMS message to SMPP transceiver 204 using SMPP protocol. Before forwarding the SMS message to SMPP transceiver 204 using SMPP protocol, SMPP transmitter 202 identifies a source address for the SMS message in step 304. A source address comprises an address, a directory number, or any other information indicating the source or sender of the SMS message. For example, the source address may be a mobile directory number (MDN), an IP address, etc. The source address may be located in header information associated with the SMS message depending on the protocol used to transport the SMS message to SMPP transmitter 202.

When SMS spoofing occurs, it is usually the case that the source address of the SMS message is replaced with another address. Thus, SMPP transmitter 202 determines whether the source address for the SMS message is authentic or trusted in step 306. The authenticity of the source address may be determined by processing one or more sets of rules in SMPP transmitter 202, some of which are described later in this description. If the determination is that the source address is authentic, then SMPP transmitter 202 may insert a validity indicator in the SMPP PDU, along with the SMS message, that the source address for the SMS message is authentic in step 308. A validity indictor comprises any value, code, or other data that indicates whether a source address is trusted, authentic, or otherwise valid. For example, SMPP transmitter 202 may insert a message type in the "esm_class" field of the PDU as a validity indicator to indicate that the source address is authentic.

If the determination is that the source address is not authentic, then SMPP transmitter 202 may insert a validity indicator in the SMPP PDU that the source address is not authentic in step 310. For example, SMPP transmitter 202 may insert a message type in the "esm_class" field of the PDU to indicate that the source address is not authentic. SMPP transmitter 202 may also insert the source address in a "source_addr" field of the PDU, and well as populate other fields of the PDU with appropriate values.

In step 312, SMPP transmitter 202 may transmit the SMPP PDU to SMPP transceiver 204 with the appropriate validity indicator. Another option shown in FIG. 3 is that SMPP transmitter 202 may discard or reject the SMS message if the source address is not authentic (see step 314).

In one alternative to method 300, if SMPP transmitter 202 is not able to determine that the source address is authentic (see step 306), then SMPP transmitter 202 may next determine whether or not the source address is "suspected" of being fake. FIG. 4 is a flow chart illustrating alternative method 400 of checking SMS messages within SMPP transmitter 202 in an exemplary embodiment. The flow of method 400 is the same as method 300 until the determination of step 306 is performed. If the determination in step 306 is that the source address is not authentic, then SMPP transmitter 202 may further determine whether the source address for the SMS message is "suspected" of being fake in step 402. The determination of whether or not the source address is suspected of being fake may again be performed by processing one or more sets of rules in SMPP transmitter 202. If the determination is that the source address is not suspected of being fake, then SMPP transmitter 202 may insert a validity indicator in the SMPP PDU that the source address is not suspected of being fake in step 404. For example, SMPP transmitter 202 may insert a message type in the "esm_class" field of the PDU to indicate that the source address is suspected of being fake. If the determination is that the source address is suspected of being fake, then SMPP transmitter 202 may insert a validity indicator in the SMPP PDU that the source address is suspected of being fake in step 406. For example, SMPP transmitter 202 may insert a message type in the "esm_class" field of the PDU to indicate that the source address is suspected of being fake. SMPP transmitter 202 may then transmit the SMPP PDU to SMPP transceiver 204 in step 312 with the appropriate validity indicator. Another option shown in FIG. 4 is that SMPP transmitter 202 may discard or reject the SMS message if the source address is not authentic or is suspected of being fake (see step 314).

In order to provide the appropriate validity indicators in the SMPP PDU, the SMPP PDU is enhanced in these embodiments. For example, one enhancement may be to set the "system_type" field as mandatory (current SMPP specifications define it as optional). The "system_type" field indicates the SMPP transmitter type, such as an ESME, SMSC, ICGW, email/IM gateway, etc. Thus, SMPP transmitter 202 may insert the appropriate value in the "system_type" field of the PDU before sending to SMPP transceiver 204.

Another enhancement may be to set appropriate values in the "protocol_id" field, which indicates the protocol in which the SMS message was received by SMPP transmitter 202. Some exemplary protocols are Simple Mail Transfer Protocol (SMTP), Hyper-Text Transport Protocol (HTTP), Simple Object Access Protocol (SOAP), etc. Thus, SMPP transmitter 202 may insert the appropriate value in the "protocol_id" field of the PDU before sending to SMPP transceiver 204.

Another enhancement may be to set the appropriate message type in the "esm_class" field to indicate whether source addresses are authentic (trusted), not authentic, suspected of being fake, not suspected of being fake, etc. This enhancement was described above in FIG. 3, as the "esm_class" field may be used as the validity indicator in the PDU.

Another enhancement may be to set the appropriate type-of-number (ton) in the "source_addr_ton" field. For example, the "source_addr_ton" field may be set to 1001 to indicate a fake national number, the "source_addr_ton" field may be set to 1010 to indicate a fake international number, the "source_addr_ton" field may be set to 1100 to indicate that no trusted address is available, etc.

Another enhancement may be to add a "source_subaddress" field. The "source_subaddress" field includes an address that is obtained from somewhere other than a source address field of the SMS message, such as in the transport layer used to transport the SMS message. For example, an SMS message having a source address of "630-555-4567" may be sent from an application having an IP address of "135.88.21.9", which is identified from the transport layer (e.g., TCP/IP). SMPP transmitter 202 inserts "630-555-4567" in the "source address" field and inserts "135.88.21.9" in the "source_subaddress" field.

SMPP transmitter 202 may use a variety of rule to determine whether a source address of an SMS message is authentic, is suspected of being fake, etc. One set of rules used by SMPP transmitter 202 to determine the authenticity of the source address may be a white or black list of trusted source addresses. A white list may provide MDNs, IP addresses, switch point codes, fully qualified domain names (FQDN), domain ranges, IP ranges, operator names, etc, that are trusted. A black list may provide MDNs, IP addresses, etc, that are not trusted. According to this set of rules, SMPP transmitter 202 checks for networks that are trusted for sending SMS messages, and/or checks for networks that are barred from sending SMS messages. For example, SMPP transmitter 202 may compare the source address for an SMS message to the white list and/or the black list. If the source address is found in the white list, then SMPP transmitter 202 may determine that the source address for the SMS message is authentic (no SMS spoofing). SMPP transmitter 202 may insert the appropriate message type in the "esm_class" field of the PDU to indicate that the source address is authentic. If the source address for the SMS message is not found in the white list or is found in the black list, then SMPP transmitter 202 may determine that the source address is not authentic (SMS spoofing). SMPP transmitter 202 may insert the appropriate message type in the "esm_class" field of the PDU (if deciding to send the PDU to SMPP transceiver 204) to indicate that the source address is not authentic.

Another set of rules used by SMPP transmitter 202 to determine whether the source address is "suspected" of being fake may be a white or black list of suspected source addresses. A white list may provide MDNs, IP addresses, etc, that are not suspected as being fake (but not trusted). A black list may provide MDNs, IP addresses, etc, that are suspected of being fake. When there is no guarantee that the source address is authentic (i.e., in the trusted white list described above), SMPP transmitter 202 checks for networks that are "suspected" of sending SMS messages with fake source addresses. If the source address for an SMS message is found in the white list, then SMPP transmitter 202 may determine that the source address is not suspected of being fake. SMPP transmitter 202 may insert the appropriate message type in the "esm_class" field of the PDU to indicate that the source address is not suspected of being fake. If the source address of the SMS message is not found in the white list or is found in the black list, then SMPP transmitter 202 may determine that the source address is suspected of being fake. SMPP transmitter 202 may insert the appropriate message type in the "esm_class" field of the PDU (if deciding to send the PDU to SMPP transceiver 204) to indicate that the source address is suspected of being fake.

Another set of rules used by SMPP transmitter 202 may be an application and protocol check. According to this set of rules, SMPP transmitter 202 checks for application types and protocols that are suspected of sending SMS messages with fake source addresses. As an example, if SMPP transmitter 202 detects that the SMS message originated from an application, such as a web portal for a social network, then SMPP transmitter 202 determines that source address is suspected of being fake. SMPP transmitter 202 may insert the appropriate protocol identification in the "protocol_id" field of the PDU (if deciding to send the PDU to SMPP transceiver 204).

Another set of rules used by SMPP transmitter 202 may be an application network check. According to this set of rules, SMPP transmitter 202 checks whether the application and portal which initiates the SMS message is from the sender's home network. If an application is identified as being from a foreign network instead of the home network, then SMPP transmitter 202 may determine that the source address is suspected of being fake.

SMPP transmitter 202 may insert the appropriate message type in the "esm_class" field of the PDU (if deciding to send the PDU to SMPP transceiver 204) to indicate that the source address is suspected of being fake.

Another set of rules used by SMPP transmitter 202 may be a sender network check. According to this set of rules, SMPP transmitter 202 checks whether the sender belongs to the home network of SMPP transmitter 202. If the sender belongs to the home network of SMPP transmitter 202, then SMPP transmitter 202 may set the appropriate value in the "source_addr_ton" field of the PDU. If the sender does not belong to the home network of SMPP transmitter 202, then SMPP transmitter 202 may set the appropriate value in the "source_addr_ton" field of the PDU (if deciding to send the PDU to SMPP transceiver 204).

Another set of rules used by SMPP transmitter 202 may be a network traffic volume threshold check (or volume accumulation rule). According to this set of rules, SMPP transmitter 202 maintains a counter for the number of SMS messages received from a source address. If the number of SMS messages received from a particular source address exceeds a volume threshold in a given time period, then SMPP transmitter 202 may determine that the source address is suspected of being fake. SMPP transmitter 202 may add the appropriate message type in the "esm_class" field of the PDU (if deciding to send the PDU to SMPP transceiver 204) to indicate that the source address is suspected of being fake. SMPP transmitter 202 may also discard or reject the SMS message when violating the volume threshold for a particular source address.

Figure 5:
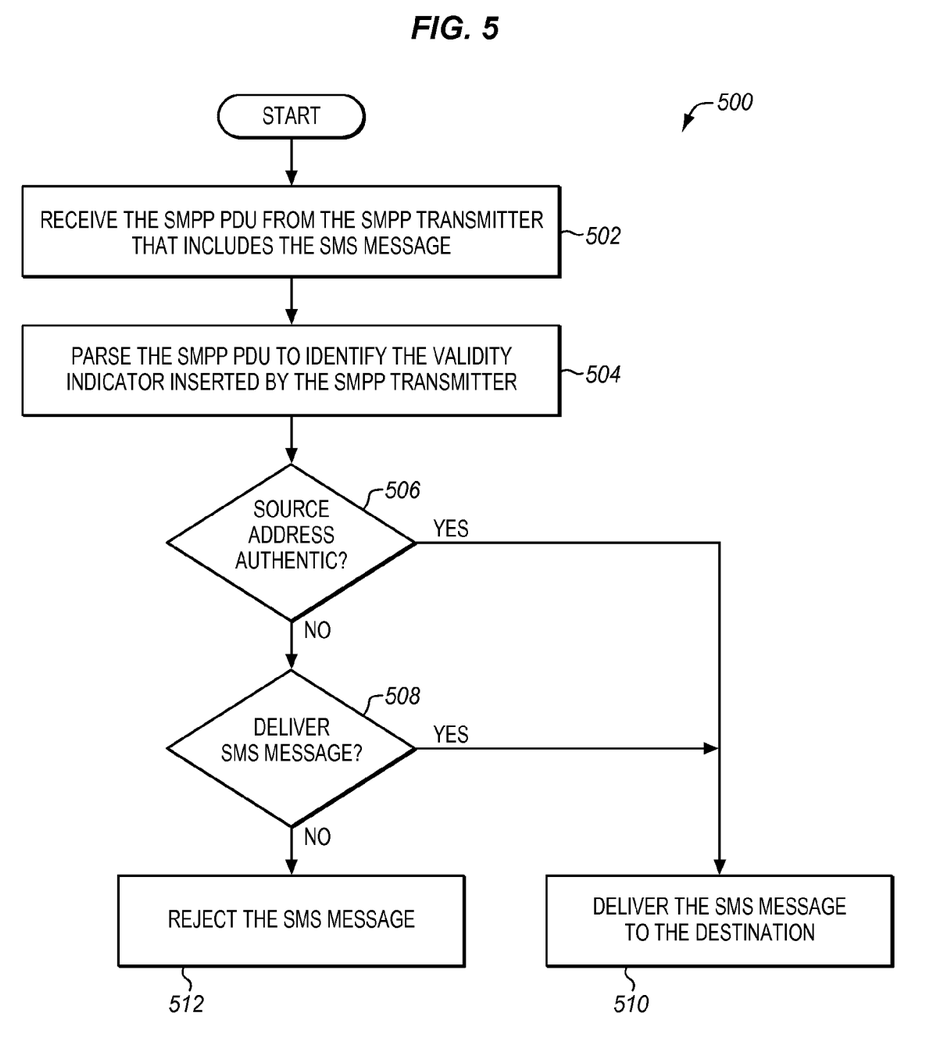
FIG. 5 is a flow chart illustrating a method of checking SMS messages within an SMPP transceiver in an exemplary embodiment.

If SMPP transmitter 202 does send the SMPP PDU to SMPP transceiver 204, SMPP transceiver 204 may perform a second layer of checking on the SMS message to determine whether or not to deliver the SMS message to the destination. FIG. 5 is a flow chart illustrating a method 500 of checking SMS messages within SMPP transceiver 204 in an exemplary embodiment. The steps of method 500 will be described with reference to SMPP system 200 in FIG. 2.

In step 502, SMPP transceiver 204 receives the SMPP PDU from SMPP transmitter 202 that includes the SMS message. In step 504, SMPP transceiver 204 parses the SMPP PDU to identify the validity indicator inserted by SMPP transmitter 202. SMPP transceiver 204 may parse the "esm_class" field, the "source_addr" field, the "source_addr_ton" field, the "source_subaddress" field, etc to identify the validity indicator. The validity indicator may indicate whether the source address for the SMS message is authentic, not authentic, suspected of being a fake, not suspected of being a fake, etc. In step 506, SMPP transceiver 204 processes the validity indicator to determine whether the source address for the SMS message is authentic. If the source address for the SMS message is authentic, then SMPP transceiver 204 may deliver the SMS message to the destination.

If the source address for the SMS message is not authentic, then SMPP transceiver 204 determines whether to deliver the SMS message to the destination in step 508 even though the source address is not authentic. SMPP transceiver 204 will then either deliver the SMS message in step 510, or discard or reject the SMS message in step 512 based on the determination in step 508.

SMPP transceiver 204 may apply one or more of the following sets of rules set to determine whether to deliver the SMS message (see step 508) to the destination even through the source address is not authentic. One set of rules used by SMPP transceiver 204 to determine whether or not to deliver the SMS message may be a white or black list of addresses. According to this set of rules, SMPP transceiver 204 checks an address inserted in the "source_subaddress" field of the SMPP PDU, which is an address in addition to the source address from the "source_addr" field. For example, an SMS message having a source address of "630-555-4567" may be sent from an application having an IP address of "135.88.21.9". SMPP transmitter 202 inserts "630-555-4567" in the "source address" field and inserts "135.88.21.9" in the "source_subaddress" field. SMPP transceiver 204 will check the address in the "source_subaddress" against the white list and/or black list. If the address is included in the white list, then SMPP transceiver 204 may deliver the SMS message to the destination. If the address is included in the black list, then SMPP transceiver 204 may discard or reject the SMS message.

Another set of rules used by SMPP transceiver 204 may be a white or black list of suspected source addresses. According to this set of rules, SMPP transceiver 204 checks the source address in the "source_addr" field of the SMPP PDU. If the source address is included in the white list, then SMPP transceiver 204 may deliver the SMS message to the destination. If the source address is included in the black list, then SMPP transceiver 204 may discard or reject the SMS message.

Another set of rules used by SMPP transceiver 204 may be a transmitter-type check. According to this set of rules, SMPP transceiver 204 checks the "system_id" and/or "system_type" fields of the SMPP PDU to identify a transmitter type for the SMS message, such as an ESME, an SMSC, an ICGW, and email/IM gateway, etc. SMPP transceiver 204 then processes criteria that define which transmitter types are allowed to deliver an SMS message to a destination even though the source address is suspected of being fake (i.e., not authentic).

Another set of rules used by SMPP transceiver 204 may be a source application and protocol check. According to this set of rules, SMPP transceiver 204 checks the "system_type" and/or "protocol_id" fields in the SMPP PDU to determine whether to deliver an SMS message to the destination even though the source address is suspected of being fake.

Another set of rules used by SMPP transceiver 204 may be a destination network check. According to this set of rules, SMPP transceiver 204 checks whether the destination indicated in the "dest_addr" field in the SMPP PDU belongs to the home network of SMPP transceiver 204. If they belong to the same network, then SMPP transceiver 204 may deliver the SMS message even though the source address is suspected of being fake. If they belong to different networks, then SMPP transceiver 204 may reject the SMS message.

Another set of rules used by SMPP transceiver 204 may be a network traffic volume threshold check (or volume accumulation rule). According to this set of rules, SMPP transceiver 204 maintains a counter for the number of SMS messages received from a source address. If the number of SMS messages received from a particular source address exceeds a volume threshold in a given time period, then SMPP transceiver 204 may reject the SMS message. If the number of SMS messages received from a particular source address does not exceed a volume threshold in a given time period, then SMPP transceiver 204 may deliver the SMS message to the destination.

Because both SMPP transmitter 202 and SMPP transceiver 204 operate to validate the source address of SMS messages, the occurrences of SMS spoofing are advantageously reduced. SMPP transmitter 202 performs a first layer of checking on the source address based on sets of rules, and provides validity indicators of whether the source address is authentic, not authentic, suspected of being fake, and/or not suspected of being fake. SMPP transceiver 204 then performs a second layer of checking on the source address based on sets of rules to determine whether or not to deliver the SMS message to its destination. The two-prong check effectively reduces the effect of SMS spoofing, such as in a mobile network.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the invention is not limited to those specific embodiments. The scope of the invention is defined by the following claims and any equivalents thereof.

We claim:

1. A system comprising:
a Short Message Peer-to-Peer (SMPP) transmitter operable to identify a Short Messaging Service (SMS) message, to identify a source address for the SMS message, and to determine whether the source address is authentic; and
if the determination is that the source address is not authentic, then the SMPP transmitter is further operable to insert a validity indicator in an SMPP Packet Data Unit (PDU) along with the SMS message that the source address is not authentic before transmitting the SMPP PDU to an SMPP transceiver.

2. The system of claim 1 wherein:
if the determination is that the source address is authentic, then the SMPP transmitter is further operable to insert a validity indicator in the SMPP PDU that the source address is authentic before transmitting the SMPP PDU to the SMPP transceiver.

3. The system of claim 1 wherein:
if the determination is that the source address is not authentic, then the SMPP transmitter is further operable to determine whether the source address is suspected of being fake; and
if the determination is that the source address is suspected of being fake, then the SMPP transmitter is further operable to insert a validity indicator in the SMPP PDU that the source address is suspected of being fake before transmitting the SMPP PDU to the SMPP transceiver.

4. The system of claim 3 wherein:
if the determination is that the source address is not suspected of being fake, then the SMPP transmitter is further operable to insert a validity indicator in the SMPP PDU that the source address is not suspected of being fake before transmitting the SMPP PDU to the SMPP transceiver.

5. The system of claim 1 wherein:
if the determination is that the source address is not authentic, then the SMPP transmitter is further operable to reject the SMS message.

6. The system of claim 1 wherein:
the SMPP transmitter is further operable to insert a message type in an "esm_class" field of the SMPP PDU to indicate that the source address is not authentic.

7. The system of claim 1 further comprising:
the SMPP transceiver operable to receive the SMPP PDU from the SMPP transmitter that includes the SMS message, and to parse the SMPP PDU to identify the validity indicator inserted by the SMPP transmitter; and
if the validity indicator in the SMPP PDU indicates that the source address for the SMS message is not authentic, then the SMPP transceiver is further operable to determine whether to deliver the SMS message to a destination.

8. The system of claim 7 wherein:
the SMPP transceiver is further operable to process at least one of an "esm_class" field, a "source_addr" field, a "source_addr_ton" field, and a "source_subaddress" in the SMPP PDU to identify the validity indicator.

9. A method comprising:
identifying a Short Messaging Service (SMS) message within a Short Message Peer-to-Peer (SMPP) transmitter;
identifying a source address for the SMS message in the SMPP transmitter;
determining whether the source address is authentic in the SMPP transmitter; and
if the determination is that the source address is not authentic, then:
inserting a validity indicator in an SMPP Packet Data Unit (PDU) along with the SMS message that the source address is not authentic before transmitting the SMPP PDU to an SMPP transceiver.

10. The method of claim 9 further comprising:
if the determination is that the source address is authentic, then:
   inserting a validity indicator in the SMPP PDU that the source address is authentic before transmitting the SMPP PDU to the SMPP transceiver.

11. The method of claim 9 further comprising:
if the determination is that the source address is not authentic, then determining whether the source address is suspected of being fake in the SMPP transmitter; and
if the determination is that the source address is suspected of being fake, then:
   inserting a validity indicator in the SMPP PDU that the source address is suspected of being fake before transmitting the SMPP PDU to the SMPP transceiver.

12. The method of claim 11 further comprising:
if the determination is that the source address is not suspected of being fake, then inserting a validity indicator in the SMPP PDU that the source address is not suspected of being fake before transmitting the SMPP PDU to the SMPP transceiver.

13. The method of claim 9 further comprising:
if the determination is that the source address is not authentic, then rejecting the SMS message in the SMPP transmitter.

14. The method of claim 9 wherein inserting a validity indicator in the SMPP PDU comprises:
inserting a message type in an "esm_class" field of the SMPP PDU to indicate that the source address is not authentic.

15. The method of claim 9 further comprising:
receiving the SMPP PDU from the SMPP transmitter in the SMPP transceiver that includes the SMS message;
parsing the SMPP PDU in the SMPP transceiver to identify the validity indicator inserted by the SMPP transmitter; and
if the validity indicator in the SMPP PDU indicates that the source address for the SMS message is not authentic, then determining in the SMPP transceiver whether to deliver the SMS message to a destination.

16. The method of claim 15 wherein parsing the SMPP PDU to identify the validity indicator comprises:
parsing at least one of an "esm_class" field, a "source_addr" field, a "source_addr_ton" field, and a "source_subaddress" in the SMPP PDU to identify the validity indicator.

17. A system comprising:
a Short Message Peer-to-Peer (SMPP) transceiver operable to receive an SMPP Packet Data Unit (PDU) from an SMPP transmitter that includes a Short Messaging Service (SMS) message, and to parse the SMPP PDU to identify a validity indicator inserted by the SMPP transmitter, wherein the validity indicator indicates whether a source address for the SMS message is authentic;
if the validity indicator in the SMPP PDU indicates that the source address for the SMS message is not authentic, then the SMPP transceiver is further operable to determine whether to deliver the SMS message to a destination.

18. The system of claim 17 wherein:
the SMPP transceiver is further operable to process a white list and a black list of trusted source addresses;
if the source address is included in the white list, then the SMPP transceiver is further operable to deliver the SMS message to the destination; and
if the source address is included in the black list, then the SMPP transceiver is further operable to reject the SMS message.

19. The system of claim 17 wherein:
the SMPP transceiver is further operable to parse a "system_id" field or a "system_type" field of the SMPP PDU to identify a transmitter type for the SMS message, and to process criteria for the transmitter type to determine whether to deliver the SMS message to the destination even though the source address is not authentic.

20. The system of claim 17 wherein:
the SMPP transceiver is further operable to parse a "dest_addr" field in the SMPP PDU to identify the destination of the SMS message, and to deliver the SMS message to the destination if the destination and the SMPP transceiver are part of the same network even though the source address is not authentic.

* * * * *